(12) United States Patent
Likus

(10) Patent No.: US 12,539,580 B2
(45) Date of Patent: Feb. 3, 2026

(54) PNEUMATIC CLAMPING AND/OR BRAKING DEVICE

(71) Applicant: HEMA Maschinen-und Apparateschutz GmbH, Seligenstadt (DE)

(72) Inventor: Edmund Likus, Seligenstadt (DE)

(73) Assignee: HEMA Maschinen- und Apparateschutz GmbH, Seligenstadt (DE)

( * ) Notice: Subject to any disclaimer, the term of this patent is extended or adjusted under 35 U.S.C. 154(b) by 0 days.

(21) Appl. No.: 18/861,667

(22) PCT Filed: Feb. 8, 2024

(86) PCT No.: PCT/EP2024/053247
§ 371 (c)(1),
(2) Date: Oct. 30, 2024

(87) PCT Pub. No.: WO2024/188559
PCT Pub. Date: Sep. 19, 2024

(65) Prior Publication Data
US 2025/0108486 A1     Apr. 3, 2025

(30) Foreign Application Priority Data

Mar. 15, 2023 (DE) .................... 20 2023 101 270.1
Mar. 15, 2023 (EP) ..................... 23162015

(51) Int. Cl.
*B25B 5/00* (2006.01)
*B25B 5/06* (2006.01)

(52) U.S. Cl.
CPC .................... *B25B 5/061* (2013.01)

(58) Field of Classification Search
CPC ..... B25B 5/061; B25B 5/00; H01L 21/67784; B24B 37/30
See application file for complete search history.

(56) References Cited

U.S. PATENT DOCUMENTS

| | | | | |
|---|---|---|---|---|
| 6,923,714 B1 * | 8/2005 | Zuniga | ................... | B24B 37/30 |
| | | | | 451/388 |
| 7,101,272 B2 * | 9/2006 | Chen | ..................... | B24B 37/30 |
| | | | | 438/692 |

(Continued)

FOREIGN PATENT DOCUMENTS

| | | |
|---|---|---|
| AT | E342149 T1 | 11/2006 |
| AT | E376132 T1 | 11/2007 |

(Continued)

OTHER PUBLICATIONS

International Search Report and Written Opinion mailed Apr. 10, 2024 in connection with International Application No. PCT/EP2024/053247.

(Continued)

*Primary Examiner* — Lee D Wilson
(74) *Attorney, Agent, or Firm* — Wolf, Greenfield & Sacks, P.C.

(57) ABSTRACT

Device for clamping and/or braking an object to be clamped and/or braked, comprising a housing; a spring arranged in the housing comprising a first and a second annular spring plate, wherein the annular spring plates are clamped in the housing between first and second contact surfaces of the housing; at least one clamping element having a clamping surface which is designed to transmit a clamping and/or braking force to the object; wherein the spring plates are arranged within the housing in such a way that at least one pressure space is formed, which can be ventilated or vented, wherein by ventilating or venting the pressure space, a bending of at least one of the spring plates can be changed and thereby the device changes between an open state and a closed state; wherein the device further comprises at least one insert plate, which is arranged between the spring plates.

20 Claims, 8 Drawing Sheets

(56) References Cited

U.S. PATENT DOCUMENTS

| | | | |
|---|---|---|---|
| 7,392,886 B2 | 7/2008 | Hofmann | |
| 7,584,828 B2 | 9/2009 | Hofmann | |
| 8,888,563 B2 * | 11/2014 | Moriya | B24B 37/30 451/287 |
| 9,327,376 B2 * | 5/2016 | Gamboa | B60V 1/043 |
| 2004/0005842 A1 * | 1/2004 | Chen | B24B 49/16 451/41 |
| 2005/0211377 A1 * | 9/2005 | Chen | B24B 37/30 216/88 |
| 2005/0245181 A1 * | 11/2005 | Chen | B24B 37/30 451/285 |
| 2006/0042892 A1 | 3/2006 | Hofmann | |
| 2007/0090610 A1 | 4/2007 | Hoffmann | |
| 2008/0000346 A1 | 1/2008 | Hofmann | |
| 2008/0119122 A1 * | 5/2008 | Zuniga | B24B 37/30 451/398 |
| 2015/0275977 A1 | 10/2015 | Muller et al. | |
| 2021/0331285 A1 | 10/2021 | Nakano et al. | |
| 2025/0108465 A1 | 4/2025 | Likus | |
| 2025/0108486 A1 * | 4/2025 | Likus | F16D 55/12 |

FOREIGN PATENT DOCUMENTS

| | | |
|---|---|---|
| AU | 2003287866 A1 | 8/2004 |
| CN | 1738696 A | 2/2006 |
| CN | 1842663 A | 10/2006 |
| CN | 203412996 U | 1/2014 |
| CN | 107127360 A | 9/2017 |
| CN | 110226053 A | 9/2019 |
| DE | 10 335 795 A1 | 3/2005 |
| DE | 10 2004 010 987 A1 | 9/2005 |
| DE | 10 2010 046 451 A1 | 3/2012 |
| DE | 10 2021 006 219 B3 | 12/2022 |
| EP | 1 585 616 A1 | 10/2005 |
| EP | 1 629 939 A1 | 3/2006 |
| EP | 1 651 881 A1 | 5/2006 |
| EP | 1 585 616 B1 | 10/2006 |
| EP | 1 651 881 B1 | 10/2007 |
| ES | 2 274 289 T3 | 5/2007 |
| ES | 2 295 903 T3 | 4/2008 |
| JP | 2006-513049 A | 4/2006 |
| JP | 2007-501361 A | 1/2007 |
| JP | 2007-526427 A | 9/2007 |
| JP | 4602256 B2 | 12/2010 |
| JP | 4607110 B2 | 1/2011 |
| JP | 4847438 B2 | 12/2011 |
| JP | 2020-003048 A | 1/2020 |
| KR | 20060024334 A | 3/2006 |
| PL | 1651881 T3 | 3/2008 |
| WO | WO 2004/067222 A1 | 8/2004 |
| WO | WO 2005/015047 A1 | 2/2005 |
| WO | WO 2005/085653 A1 | 9/2005 |
| WO | WO 2006/021120 A1 | 3/2006 |

OTHER PUBLICATIONS

PCT/EP2024/053247, Apr. 10, 2024, International Search Report and Written Opinion.

* cited by examiner

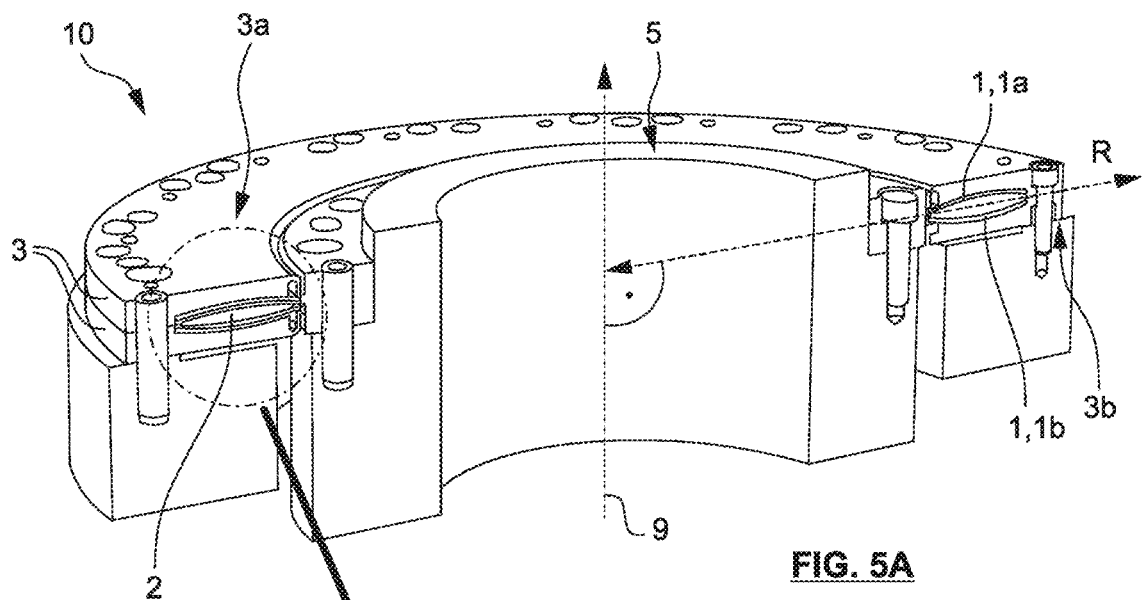
FIG. 5A
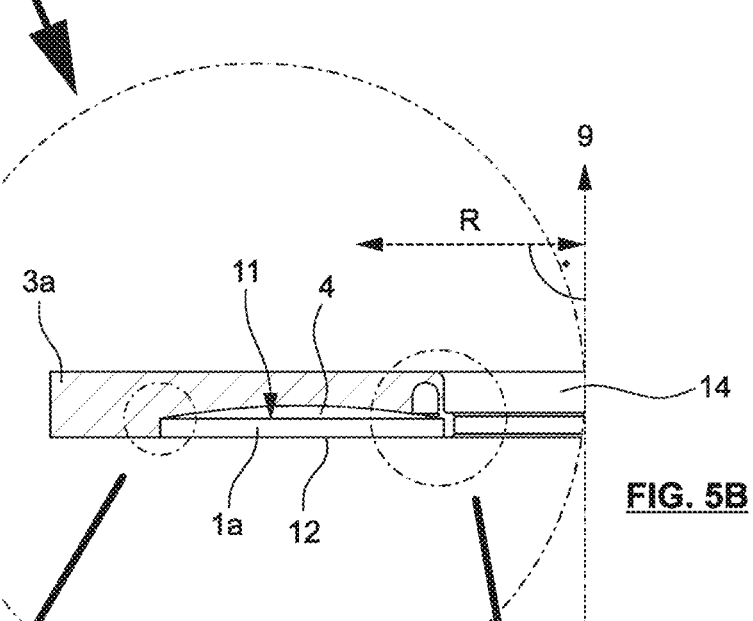
FIG. 5B
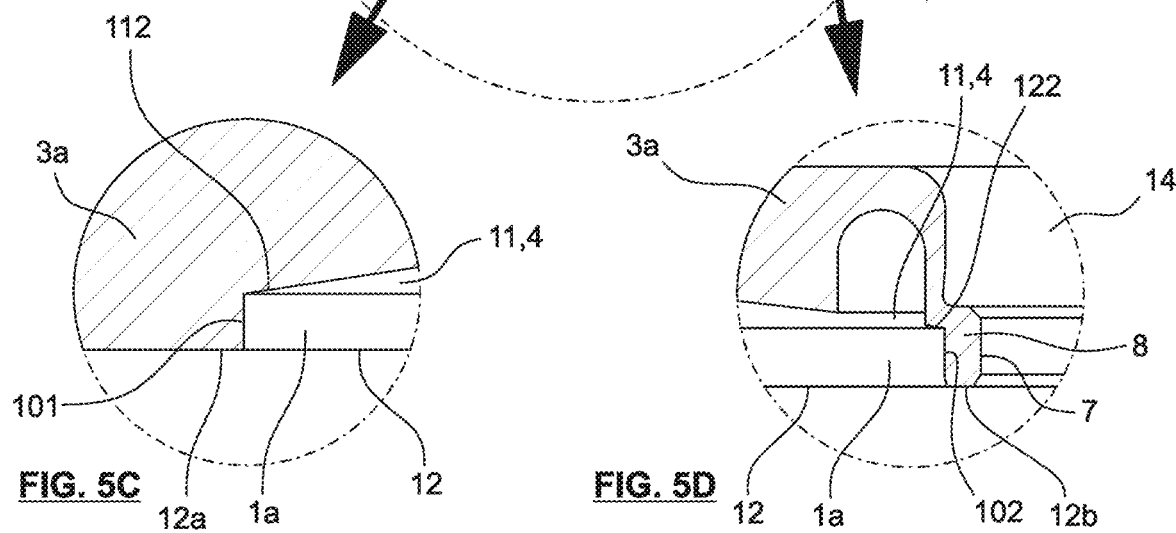
FIG. 5C
FIG. 5D

PNEUMATIC CLAMPING AND/OR BRAKING DEVICE

CROSS-REFERENCE TO RELATED APPLICATIONS

This application is a national stage filing under 35 U.S.C. § 371 of International Application No. PCT/EP2024/053247, filed Feb. 8, 2024, which claims the benefit of European Application No. 23162015.4, filed Mar. 15, 2023, and German Application No. 20 2023 101 270.1, filed Mar. 15, 2023. The contents of these applications are incorporated herein by reference in their entirety.

DESCRIPTION

Technical Field

The disclosure relates to a pneumatic clamping and/or braking device.

Background

In the production of tool or machine parts, processing machines, in particular work spindles or other machine tools, are used which process material from a workpiece by means of tools fastened to a shaft, in particular in order to bring it into the desired shape. The shaft can be an axis of rotation or pivot axis of such a machine. Furthermore, rotatable or pivotable tables are used by means of a shaft to place tools or workpieces in the suitable processing position or to move workpieces at corresponding speeds. A prerequisite for precise and efficient processing is, inter alia, a high rotational speed of the shaft. Emergency or safety systems therefore have the task of stopping the shaft in the event of malfunction or failure of the systems, such as, for example, power failure or cable breakage, or of holding it in a fixed position and thus fixing it.

Conventional processing machines have electromagnetic, hydraulic or pneumatic clamping and/or braking devices. Such devices have a friction lining which can be frictionally connected to the shaft by means of force transmission. Fixing the shaft at different speeds is thereby made possible.

In the case of hydraulic clamping devices, a chamber is charged with hydraulic oil and clamps the rotating shaft or disc. Passive hydraulic clamps are also known. However, such hydraulic clamps have long reaction times or short reaction times require a very high outlay there. Furthermore, the hydraulic material, in particular hydraulic valves and hydraulic tubes, is costly and requires longer assembly times. An additional outlay for maintaining the cleanliness in the surroundings of a hydraulic clamp is also caused by the hydraulic oil.

In the case of pneumatic clamping and/or braking devices, elastic components, in particular resilient plates, are usually charged with compressed air and can overcome some of the mentioned disadvantages of hydraulic clamping devices. EP 1585616 B1 and EP 1651881 B1 describe pneumatic clamping devices with two annular spring plates, which are introduced into a housing of the clamping devices and form a pressure chamber there, which can be charged with compressed air or can be ventilated and vented in order to change the bending of the spring plates and thereby to change between a closed state of the clamping devices, in which an object to be clamped is clamped like a rotatable shaft, and an open state of the clamping devices, in which the object is free. However, it has been shown in practice that wear occurs at the contact between the pneumatic clamping device and the object, which should be reduced in order to increase the service life of the device and to avoid damage to the object.

BRIEF DESCRIPTION

Proceeding from the prior art mentioned in the introduction, the disclosure is based on the object of providing a pneumatic clamping and/or braking device in which wear at the contact between the device and the object to be clamped and/or braked is reduced.

This object is achieved with a clamping and/or braking device having the features of patent claim 1. Preferred embodiments are described in the dependent claims, in the description and in the figures.

According to the solution according to the invention, a clamping and/or braking device for clamping and/or braking an object to be clamped and/or braked is proposed, the device comprising: a housing comprising a first housing part and a second housing part, wherein each of the housing parts comprises an annular recess which defines a first contact surface of the housing part and a second contact surface of the housing part, and wherein the two housing parts are arranged with respect to one another and fastened to one another in such a way that the recesses of the first and second housing parts together form an inner space within the housing; a spring arranged in the inner space comprising a first annular spring plate and a second annular spring plate, wherein the first annular spring plate is clamped in the annular recess of the first housing part between the first contact surface and the second contact surface of the first housing part, and wherein the second annular spring plate is clamped in the annular recess of the second housing part between the first contact surface and the second contact surface of the second housing part; at least one clamping element, wherein each clamping element has a clamping surface which is designed, when a first end of one of the spring plates is supported on the first contact surface of one of the housing parts and a second end of the one of the spring plates presses on the second contact surface of the one of the housing parts, to transmit a clamping and/or braking force to the object to be clamped and/or braked; wherein the spring plates are arranged within the inner space in such a way that at least one pressure space is formed in the inner space, which pressure space is at least partially delimited by the spring plates, wherein the pressure space is ventilable or ventable and can be acted upon by positive pressure of a pressure medium which can be supplied to the housing, wherein the spring plates are arranged relative to the at least one pressure space in such a way that, by ventilating or venting the pressure space or acting upon the pressure space with positive pressure, a bending of at least one of the spring plates is changable and as a result the clamping and/or braking device changes between an open state, in which the clamping surface (7) is spaced apart from the object, and a closed state, in which one or more of the at least one clamping surfaces transmit a clamping and/or braking force to the object; wherein the clamping and/or braking device further comprises at least one insert plate which is arranged between the first spring plate and the second spring plate in the inner space.

As used herein, the term "ventilating" is intended to mean "allowing air to enter", and the term "venting" is intended to mean "allowing air to exit".

The present disclosure is based on the finding of the inventors that, by introducing at least one insertion plate between the two spring plates, the clamping and/or braking device can be configured to be thicker or wider in the axial direction without changing the dynamics of the spring plates. The insertion plate displaces volume between the spring plates and thus allows the device to be configured to be axially thicker or wider, without an increase of the volume available for the pressure medium between the spring plates that would (disadvantageously) change the opening and closing speed, and thus the dynamics, of the spring plates. By means of an axially thicker or wider clamping and/or braking device, the contact surface (clamping surface) between the device and the object is increased in the closed state of the device, which reduces the wear at the contact between object and device. In addition, a more effective clamping and/or braking of the object is achieved by means of the larger contact surface (clamping surface). Overall, a more durable and even more effective clamping and/or braking of the object can thus be achieved. Furthermore, the insertion plate has the effect that an axially thicker or wider device can be produced using existing materials and processes, without significant additional outlay in the production of the device.

According to a preferred aspect of the disclosure, the (preferably single and/or one-piece) insertion plate extends in each of the housing parts between the respective first contact surface and the respective second contact surface, which leads to a distribution of the described effects of the insertion plate in both housing parts. In particular, the volume displacement of the insertion plate takes place (e.g. uniformly) in both housing parts, in order thus to leave the dynamics of each of the spring plates as unchanged as possible. Preferably, the insertion plate is arranged with its thickness in each case approximately in half in each of the housing parts, which is advantageous for a symmetrical configuration and dynamics of the device. The insertion plate can particularly preferably have a thickness of at least 1 mm, of at least 2 mm, of at least 3 mm, or of at least 4 mm, which brings about an increase of the thickness of the device by the same amount, without impairing or changing the dynamics of the spring plates, and likewise leads to a corresponding extension of the contact surface (clamping surface) between the device and the object in the axial direction, which is advantageous for conventional application of such clamping and/or braking devices.

According to a preferred aspect of the disclosure, the at least one pressure space comprises one or more second pressure spaces, wherein the one or more second pressure spaces are arranged inside the spring between each of the two spring plates and the insertion plate. For example, between the insertion plate and each of the two spring plates a separate second pressure space can be formed to which a pressure medium can be applied separately from the outside, or the regions of the inner space between the insertion plate and each of the two spring plates together form a second pressure space to which a pressure medium can be applied from the outside. The clamping and/or braking device can be designed such that by ventilating the one or more second pressure spaces or by applying positive pressure to the one or more second pressure spaces, the first contact surface and the second contact surface of at least one of the two housing parts move towards one another and/or the bending of at least one of the spring plates is increased and the device changes thereby from the closed state to the open state, without the dynamics of the spring plates being substantially changed by the insertion plate. The inventors have recognised that if no insertion plate were introduced, a larger volume in the second pressure space due to a larger axial thickness or width of the device would change the dynamics of the spring plates. If, instead of the insertion plate, a rubber coating of the spring plates or the spring plates themselves were configured to be thicker, this would likewise change the dynamics of the spring plates, which would be disadvantageous.

According to a preferred aspect of the disclosure, the insertion plate is arranged to be rigid and/or floating. This ensures a defined resistance for the spring plates, which are preferably rubberized for the sealing, both on the inner and outer diameter and on the connections for the ventilation/ venting and charging with compressed air, so that an improved sealing effect can be achieved in the region of the spring plates, in particular in the (second) pressure space between the spring plates.

According to a preferred aspect of the disclosure, the clamping element has the clamping surface on a first side surface and the second contact surface of one of the housing parts on a second side surface which is preferably facing away from and/or opposite the first side surface. As a result, the spring force brought about by the spring plates on the clamping element is guided particularly effectively via the clamping surface onto the object.

According to a preferred aspect of the disclosure, the clamping element is elastic such that the clamping element forms a lever arm which is designed to deform elastically by pressing at least one of the spring plates on the second contact surface of at least one of the housing parts and thereby to rotate about a pivot point such that the clamping surface of the clamping element transmits the clamping and/or braking force to the object to be clamped and/or braked. By virtue of the fact that the clamping element forms an elastically deformable lever arm which presses the clamping surface against the object by means of rotation in order thus to transmit the clamping and/or braking force to the object, a longer lever arm in the clamping element is also additionally made possible by the insertion plate (without changing the spring plate dynamics), which has several advantageous effects on the device.

By means of a longer lever arm, the holding moment acting on the object increases with the same (axial) bending of the spring plates. On the one hand, the longer lever arm as such brings about a greater holding moment. On the other hand, the holding moment is also increased by the fact that a longer lever arm of the clamping element strikes the object earlier during the closing operation and, in this state of earlier striking the object, the spring plates are bent to an even greater extent or are less relaxed. As a result, there is a greater remaining spring force (the spring force is caused by the restoring force of the spring plate) which acts on the second contact surface(s) and which thus brings about a greater clamping and/or braking force than if the lever arm were to strike the object later during the closing. The holding moment is thus increased by the longer lever arm and by the greater clamping and/or braking force. On account of its elasticity, the longer lever arm also leads to a greater and/or more effective contact surface (clamping surface in the region of the end of the lever arm) being brought about between clamping element and the object, which also additionally reduces the wear at object and device. This wear-reducing effect by means of a greater and/or more effective contact surface (clamping surface) is additional to the wear-reducing effect which is brought about by the greater contact surface that is made possible by the axially thicker or wider device. A greater contact surface allows a smaller compressive stress (force per surface) with the same holding moment. The longer lever arm thus leads overall to a strong but at the same time more durable clamping and/or braking of the object by means of a greater holding moment combined with lower wear.

According to a preferred aspect of the disclosure, the lever arm is designed such that during the rotation of the lever arm about the pivot point an end of the lever arm is moved closer to the object by a radial stroke. By making a longer lever arm possible, the possibility of a greater radial stroke is also created—with the same (axial) bending of the spring plates—which increases substantially proportionally with the length of the lever arm. Making a greater radial stroke possible allows an undesired frictional contact, and thus additional wear, to be avoided. Such undesired frictional contacts can occur on the one hand because the object, for example a shaft, has been dimensioned larger than expected and, for example, there is a risk of grinding on the clamping surface even in the open state of the device, or because during operation thermal changes occur on the part of the object and/or the clamping device which lead to the clamping surface grinding on the object. As a result, damage or wear can occur on the object and/or the clamping surface. The greater radial stroke thus makes it possible on the one hand to clamp and/or brake a larger plurality of objects of different dimensions, for example shafts of different thicknesses, by means of the device. On the other hand, it is thereby furthermore made possible that thermally induced wear can be avoided. The length of the lever arm from the pivot point to the end of the lever arm is preferably chosen such that the radial stroke is at least 0.13 mm, preferably at least 0.15 mm, particularly preferably at least 0.17 mm. Such radial strokes are suitable for clamping and/or braking a larger plurality of the usual objects of different dimensions (e.g. shafts) and for avoiding usual thermally induced frictional contacts. Preferably, the length (cf. $L_2$ in FIG. 7) of the lever arm from the pivot point (cf. D in FIG. 7) to the end (cf. 8b in FIG. 7) of the lever arm is 4 mm to 8 mm, 5 mm to 7 mm (e.g. approximately 5.5 mm), 6 mm to 7 mm or approximately 6.6 mm, which is more than the corresponding length $L_1$ in conventional devices 10 without an insertion plate and which promotes the achievement of such particularly advantageous radial strokes.

According to a preferred aspect of the disclosure, the annular recess of each housing part defines an annular opening in the housing part, wherein the annular opening is formed between a first annular edge of the housing part and a second annular edge of the housing part, wherein the first contact surface of each housing part is delimited by the first annular edge of the housing part and a first stop of the housing part such that, when one of the spring plates is introduced from the outside past the first annular edge into the recess of the housing part, the first stop forms an obstacle to a deeper introduction of the spring plate into the recess, preferably wherein the distance between the first stop and the first annular edge is 3 mm to 6 mm, 4 mm to 5 mm, or approximately 4.7 mm, and/or wherein the second contact surface of each housing part is delimited by the second annular edge of the housing part and a second stop of the housing part such that, when one of the spring plates is introduced from the outside past the second annular edge into the recess of the housing part, the second stop forms an obstacle to a deeper introduction of the spring plate into the recess, preferably wherein the distance between the second stop and the second annular edge is 3 mm to 6 mm, 4 mm to 5 mm, or approximately 4.7 mm. Such one or more stops bring about a more reliable and positioning of the spring plate(s) and a more effective introduction of the spring force of the spring plate(s) onto the second contact surface, and thus a more reliable and effective opening and closing function. The particularly advantageous radial strokes addressed are also achieved even more effectively by means of such distances.

According to a preferred aspect of the disclosure, each of the housing parts comprises a first latching means and a second latching means, wherein the respective spring plate is clamped in the recess of the housing part between the first contact surface and the second contact surface of the housing part such that the first latching means latches the first end of the respective spring plate to the first contact surface and the second latching means latches the second end of the respective spring plate to the second contact surface. The aspect of the present disclosure is based on the finding of the inventors that the axial positioning of the spring plates inside the housing of the clamping and/or braking device is of decisive importance for the opening and closing function of the clamping and/or braking device. In particular, the inventors have recognised that the axial positioning of the spring plates during assembly has hitherto been decisively dependent on the axial press-in pressure and therefore the spring plates could easily assume different axial positions inside the housing. The inventors have recognised that a well-defined and symmetrical positioning of the spring plates inside the housing should be reliably achieved in order to reliably achieve the desired symmetrical opening and closing function of the clamping and/or braking device. Such a well-defined and symmetrical positioning of the spring plates inside the housing has hitherto placed high demands on the axial pressing of the springs into the housing during assembly and has hitherto proven to be difficult and expensive in practice.

Against this background, the inventors have recognised that by means of a housing part comprising a first latching means and a second latching means, which are each designed to latch another end of a clamped spring plate, a predetermined axial positioning of the spring plates inside a housing of a pneumatic clamping and/or braking device is achieved, which no longer decisively depends on the axial press-in force during assembly, but a repeatable, well-defined and symmetrical positioning of the spring plates inside the housing of the clamping and/or braking device is achieved.

The first latching means can be designed, in particular during operation of the clamping and/or braking device, to hold the first end of the spring plate in a predefined position with respect to the first contact surface and/or the second latching means can be designed, in particular during operation of the clamping and/or braking device, to hold the second end of the spring plate in a predefined position with respect to the second contact surface.

The latching means have also proven themselves in practice during assembly, since they even simplify the assembly of the spring plates. In addition, the latching means bring about further advantages of the type described below, such as, for example, improved tightness inside the housing, so that the latching means have a diverse positive effect on the operation of the overall system of the clamping and/or braking device.

According to a preferred aspect of the disclosure, the first latching means comprises a first projection of the first contact surface and the first stop, which together latch the first end of the respective spring plate between the first projection and the first stop in the region of the first contact surface, and/or the second latching means comprises a second projection of the second contact surface and the second stop, which together latch the second end of the respective spring plate between the second projection and the second stop in the region of the second contact surface. As a result of this specific implementation of the first and second latching means, a particularly effective and symmetrical latching of the spring plates is brought about, which, however, also at the same time facilitate the insertion of the spring plates into the housing parts and do not require additional components and materials for the housing, which is advantageous for production and assembly.

Each of the projections can comprise a height transition between two adjacent regions of the associated contact surface. One of the two regions can lie between the respective stop and the height transition and can be the region against which one end of the spring plate bears, and the other region can be the region between the height transition and the respective annular edge of the annular opening of the recess. Each of the projections can comprise a step or ramp as the height transition. The ramp can be an oblique plane, but can also have differently shaped slopes, such as, for example, a curvature. Other configurations of the projections are, however, likewise conceivable.

Preferably, the first stop can have a longer extent in the radial direction of the annular recess than the first projection and/or the second stop can have a longer extent in the radial direction of the annular recess than the second projection. Particularly preferably, each of the projections can project into the recess by 0.025 mm to 0.15 mm, preferably 0.05 mm to 0.1 mm, particularly preferably by 0.1 mm or 0.05 mm with respect to the respective contact surface in a radial direction of the annular recess. Such a projection by the projections can be particularly advantageous for the reliable latching of the spring plates with regard to customary shortenings of the spring during operation on the one hand and the simple insertion of the spring plates into the housing parts on the other hand.

According to a preferred aspect of the disclosure, the first projection can be arranged between the first annular edge and the first stop on the first contact surface of the respective housing part in the region of the recess, preferably the first projection, or the step or ramp of the first projection, can be arranged at a distance of 2 mm to 6 mm, 3 mm to 5 mm, 3 mm to 4 mm, or about 3.2 mm from the first annular edge on the first contact surface of the housing part in the region of the recess, and/or wherein the second projection is arranged between the second annular edge and the second stop on the second contact surface of the respective housing part in the region of the recess, preferably wherein the second projection, or the step or ramp of the second projection, is arranged at a distance of 2 mm to 6 mm, 3 mm to 5 mm, 3 mm to 4 mm, or about 3.2 mm from the second annular edge on the second contact surface of the housing part in the region of the recess. Such an arrangement of the one or more projections brings about a more reliable and effective latching and introduction of the spring force of the spring plate(s) with customary thicknesses, and possibly present rubber coatings of the spring plate(s), onto the object and thus a symmetrical and effective opening and closing function for such spring plates. The particularly advantageous radial strokes addressed are also achieved even more effectively for such spring plates by means of such distances.

The annular recess can define an annular opening in the housing part, wherein the annular opening is formed between a first annular edge of the housing part and a second annular edge of the housing part. The first projection can preferably be arranged between the first annular edge and the first stop on the first contact surface of the housing part in the region of the recess. The height transition (e.g. the step or ramp) of the first projection can be on the first contact surface. At a distance of 3 mm to 6 mm, preferably 3 mm to 5 mm, particularly preferably 3 mm to 4 mm or 3.2 mm from the first annular edge, the height transition of the first projection can preferably be arranged on the first contact surface on the inner side of the housing part in the region of the recess and the first projection can extend over this distance. The first projection can extend continuously from the first annular edge to the height transition. The second projection can preferably be arranged between the second annular edge and the second stop on the second contact surface of the housing part in the region of the recess. The height transition (e.g. the step or ramp) of the second projection can be on the second contact surface. At a distance of 3 mm to 6 mm, preferably 3 mm to 5 mm, particularly preferably 3 mm to 4 mm or 3.2 mm from the first annular edge, the height transition of the second projection can preferably be arranged on the second contact surface on the inner side of the housing part in the region of the recess and the second projection can extend over this distance. The second projection can extend continuously from the second annular edge to the height transition. Such an arrangement of the projections or steps or ramps can be particularly advantageous for the reliable positioning of the spring plates inside the recess or the housing with regard to customary operating parameters of the clamping device on the one hand and the simple insertion of the spring plates into the housing parts on the other hand.

If this brief description describes features which are not listed in the claims, these features do not constitute essential features in the sense that these features are necessarily to be included in the claims, but these features are particularly prominent preferred implementations of the claimed subject matter, can be combined with each of the claims and can also be combined with one another as desired.

BRIEF DESCRIPTION OF THE FIGURES

FIG. 5A shows a cross section through an inventive pneumatic clamping and/or braking device in a three-dimensional representation.

FIGS. 5B to 5D show an inventive variant of a housing part taken from FIG. 5A.

FIGS. 6A to 6B each show a particularly preferred inventive variant of a housing part taken from FIG. 5A in the lower region of the respective figure.

Figure 1A:
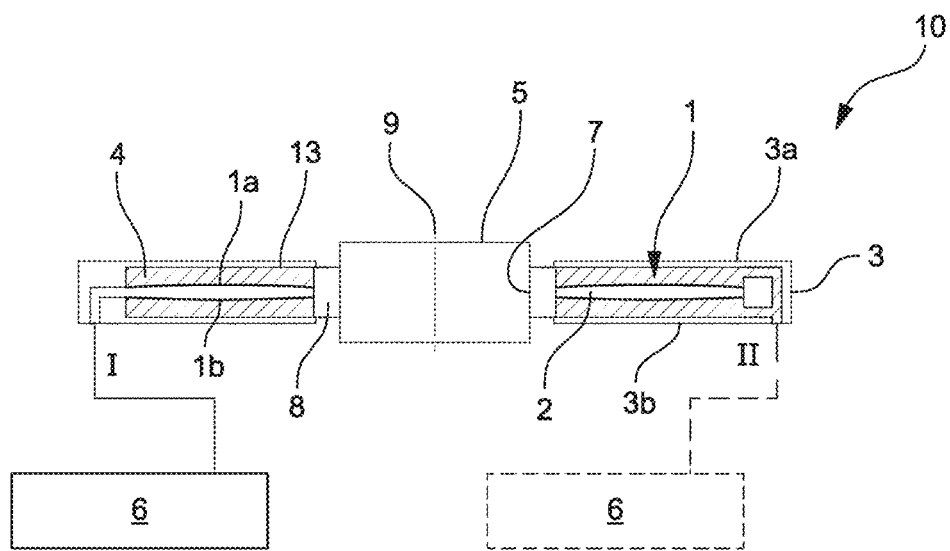
FIG. 1A shows a schematic cross section through an inwardly directed passive pneumatic clamping and/or braking device according to the invention in the closed state.

Components which are represented in a plurality of figures bear the same reference signs.

DETAILED DESCRIPTION

The disclosure relates to a housing part for a pneumatic clamping and/or braking device and to a pneumatic clamping and/or braking device having a housing part according to the invention.

If in this document reference is made to the device "clamp" or "clamping device", the "clamping force" or the process of "clamping", then the device of the "brake" or "braking device" or the "braking force" or the process of "braking" is likewise also comprised.

FIGS. 1A to 5A show schematic cross sections through such a pneumatic clamping device 10 according to the invention having a housing 3 which comprises two housing parts 3a, 3b, and having a spring 1 which is arranged in the housing 3 and which comprises at least two annular spring plates 1a, 1b.

The clamping device 10 according to the invention comprises the following: a housing 3 comprising a first housing part 3a and a second housing part 3b, wherein each of the housing parts 3a, 3b comprises an annular recess 11 (cf. FIGS. 6A to 7) which defines a first contact surface 101 of the housing part 3a, 3b and a second contact surface 102 of the housing part 3a, 3b, and wherein the two housing parts 3a, 3b are arranged with respect to one another and are fastened to one another in such a way that the recesses 11 of the first and second housing parts 3a, 3b together form an inner space 13 within the housing 3; a spring 1 which is arranged in the inner space 13 and comprises a first annular spring plate 1a and a second annular spring plate 1b, wherein the first annular spring plate 1a is clamped in the annular recess 11 of the first housing part 3A between the first contact surface 101 and the second contact surface 102 of the first housing part 3A, and wherein the second annular spring plate 1b is clamped in the annular recess 11 of the second housing part 3A between the first contact surface 101 and the second contact surface 102 of the second housing part 3A; at least one clamping element 8, wherein each clamping element 8 has a clamping surface 7 which is designed to transmit a clamping and/or braking force $F_3$ (cf. FIG. 7) to the object 5 to be clamped and/or braked when a first end of one of the spring plates 1a, 1b is supported on the first contact surface 101 of one of the housing parts 3a, 3b and a second end of the one of the spring plates 1a, 1b presses on the second contact surface 102 of the one of the housing parts 3a, 3b; wherein the spring plates 1a, 1b are arranged within the inner space 13 in such a way that at least one pressure space 2, 4 is formed in the inner space 13 and is delimited at least partially by the spring plates 1a, 1b, wherein the pressure space 2, 4 is ventilatable or ventable and can be acted on by positive pressure of a pressure medium which can be fed to the housing 3, wherein the spring plates 1a, 1b are arranged relative to the at least one pressure space 2, 4 in such a way that, by ventilating or venting the pressure space 2, 4 or acting on the pressure space 2, 4 with positive pressure, a bending of at least one of the spring plates 1a, 1b can be changed and as a result the clamping and/or braking device 10 changes between an open state, in which the object 5 is not touched by one or any one of the clamping surfaces 7 but is spaced apart from the clamping surfaces 7, and a closed state, in which one or more of the clamping surfaces 7 transmit a clamping and/or braking force to the object 5. The inventive clamping and/or braking device 10 further comprises at least one insert plate 100 (cf. FIG. 7) which is arranged between the first spring plate 1a and the second spring plate 1b in the inner space 13. The device 10 can change, for example, from the closed state to the open state or vice versa.

FIGS. 1A, 1B, 4A and 4B each show such clamping devices 10 in the closed state in that the clamping surface 7 of the clamping element 8 contacts the circumference of the object 5. The clamping element 8 is also referred to as a clamping lip. The clamping element 8 can be formed in one piece with the other parts of the housing part 3a, 3b or can be a component of the housing part 3a, 3b which is structurally separated from the other parts.

Figure 1B:
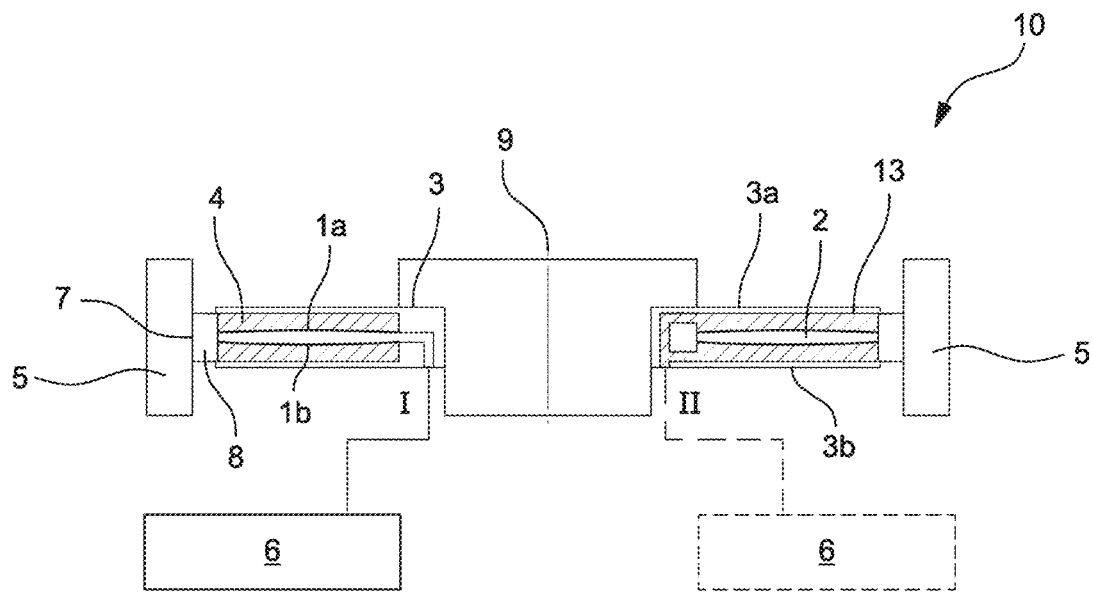
FIG. 1B shows a schematic cross section through an outwardly directed passive pneumatic clamping and/or braking device according to the invention in the closed state.
Figure 4A:
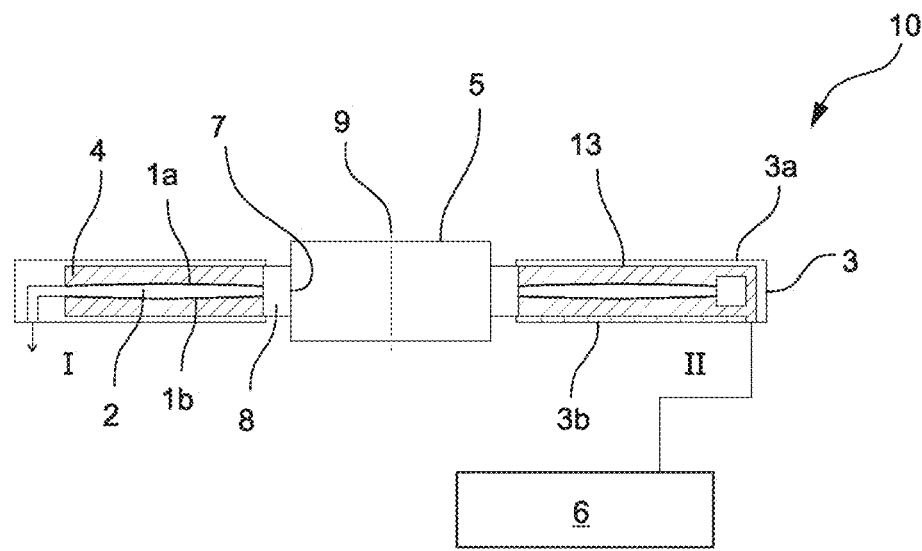
FIG. 4A shows a schematic cross section through an inwardly directed active pneumatic clamping and/or braking device according to the invention in the closed state.
Figure 4B:
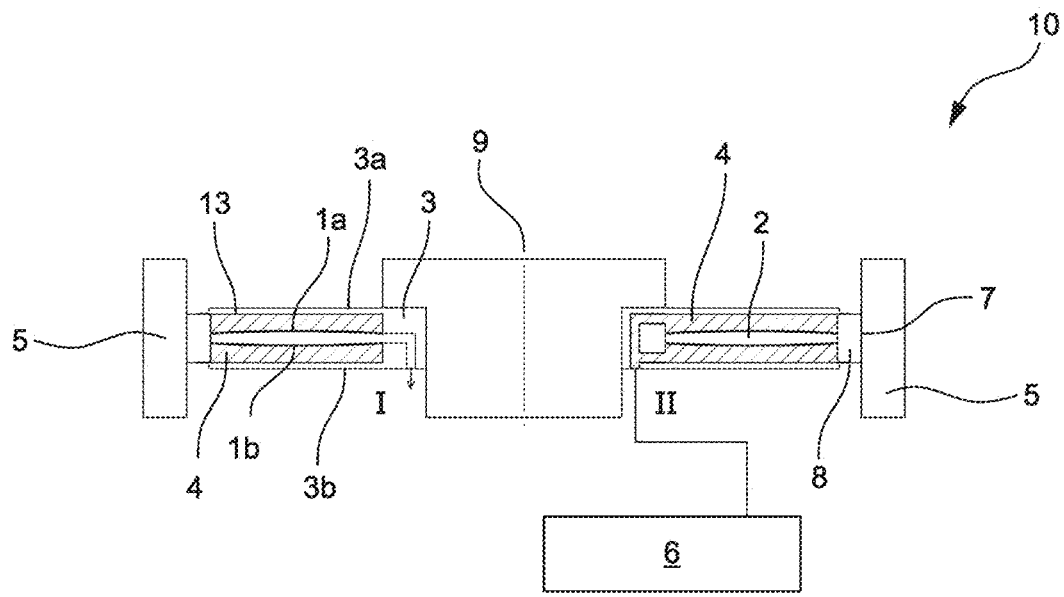
FIG. 4B shows a schematic cross section through an outwardly directed active pneumatic clamping and/or braking device according to the invention in the closed state.

The clamping force $F_3$ (cf. FIG. 7) or clamping effect of the clamping surface 7 on the object 5 to be clamped takes place in a clamping plane which is spanned by two vectors which each form a radius of the annular spring plates 1a, 1b or annular recess 11 (cf. FIG. 5A). The axis 9 can be referred to as the main axis of the clamping device 10 which runs perpendicular to the clamping plane. The clamping device 10 can be configured to be rotationally symmetrical about this main axis 9. The main axis 9 can run approximately or precisely centrally through an opening of the clamping device 10 (opening 14 in FIG. 5B). In FIGS. 1A, 4A, the object 5 to be clamped, for example a rotatable shaft of a machine or a table, is placed within the opening 14 and the clamping force of the clamping device is therefore directed radially inward toward the main axis 9 (perpendicular to the main axis 9) within the clamping plane. In FIGS. 1B, 4B, the object 5 to be clamped is placed outside the clamping device 10 and the clamping force of the clamping device is therefore directed radially outward away from the main axis 9 (perpendicular to the main axis 9) within the clamping plane.

In FIGS. 1A, 2A, 3A, 4A, the clamping element 8 is located between spring 1 and opening 14 or main axis 9. In FIGS. 1B, 2B, 3B, 4B, on the other hand, the object 5 to be clamped at least partially surrounds the clamping device 10, so that the clamping element 8 is located there between object 5 and opening 14 or main axis 9. In FIGS. 1B, 2B, 3B, 4B, instead of the object 5 to be clamped, a component which at least partially fills the opening 14 can be introduced into opening 14, through which component the main axis 9 extends.

In FIGS. 1A to 5A, in each case the spring 1 is clamped between two contact surfaces (101 and 102 in FIGS. 5C and 5D) within the housing 3 of the clamping devices 10 and extends between the two contact surfaces. In the pressureless initial state of the device 10 in FIGS. 1A to 2B, the spring 1 can be slightly bent in order to be fixed fixedly in the housing 3 in this state and the same can apply to any other state of the device 10, the degree of bending of the spring 1 depending on the state in which the device 10 is located. If the device 10 is in a state in which the spring 1 is bent (e.g. bent to a greater extent than in the pressureless initial state, such as in the open state), venting of an inner pressure space 2 of the spring 1 and venting of an outer pressure space 4 can lead to the at least partial relaxation of the spring 1 while the spring 1 presses against the radial contact surfaces, the spacing of which increases somewhat, so that the housing 3 is thereby elastically deformed in the region of the clamping element 8 or the clamping surface 7 and the clamping surface 7 thereby contacts the object 5 and is pressed against the object 5 with a (predefined) clamping force in order to clamp the object 5 fixedly. The object 5 is fixedly clamped and the clamping device 10 is in the closed state, as shown in FIGS. 1A and 1B. In the closed state of the device 10, the spring 1 can still be slightly bent even after the partial relaxation in order to be fixed fixedly in the housing 3 in this state.

In this case, the clamping element 8 can be an elastic element, such as a spring fork, which, in the pressureless initial state of the device 10, is brought by the spring force $F_2$ (cf. FIG. 7) of the (slightly) bent spring 1 from an initial position, in which the elastic element is relaxed, into a relaxed position, for example by bending of the spring fork 8, until an equilibrium between a restoring force of the elastic element 8 and the spring force of the spring 1 arises in the pressureless initial state. In the case of this equilibrium, for example, the clamping surface 7 can press against the object 5 with the clamping force $F_3$.

By additionally applying compressed air (for example with 4 bar or 6 bar) to the outer pressure space 4 in the closed state, there is the optional possibility of increasing the clamping force by a predetermined value. This is indicated in FIGS. 1A, 1B by the optional additional compressed air pump (booster) 6 and the hatching (compressed air) in the outer pressure space 4. The outer pressure space 4 can be connected by means of an opening in the housing 3 to an air connection II (also referred to as "close"), to which the compressed air pump 6 can be connected.

As a result, for example, actuation of the device 10 is possible in such a way that a change takes place between a braked movement (in the pressureless state) of the charged object 5 and complete clamping of the object (in the case of sufficient pressure application).

Even if two pressure spaces 2, 4 are shown and described here by way of example, the clamping device 10 can also be operated with a single pressure space, which can be, for example, the inner pressure space 2 or the outer pressure space 4.

Figure 2A:
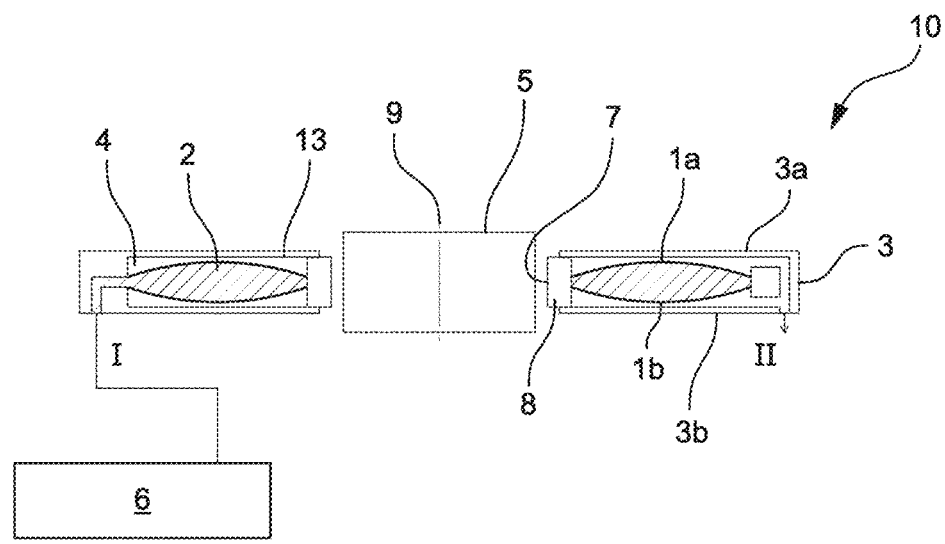
FIG. 2A shows a schematic cross section through an inwardly directed passive pneumatic clamping and/or braking device according to the invention in the open state.
Figure 2B:
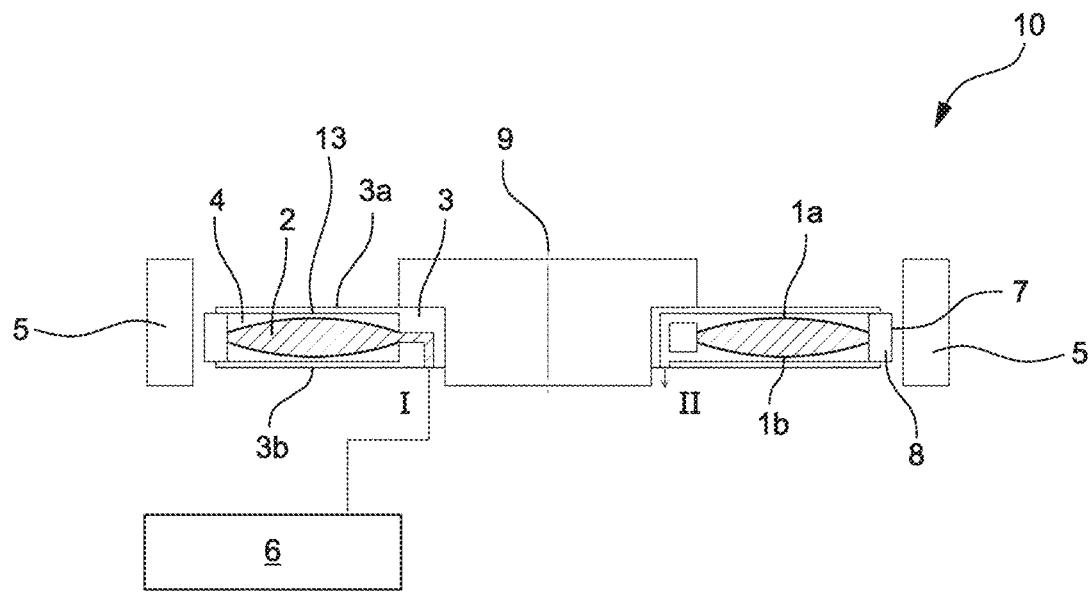
FIG. 2B shows a schematic cross section through an outwardly directed passive pneumatic clamping and/or braking device according to the invention in the open state.
Figure 3A:
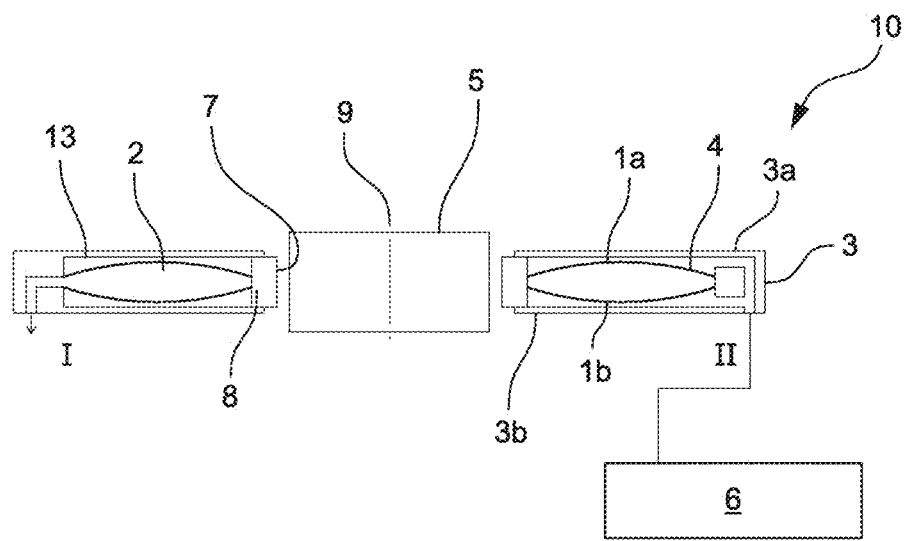
FIG. 3A shows a schematic cross section through an inwardly directed active pneumatic clamping and/or braking device according to the invention in the open state.
Figure 3B:
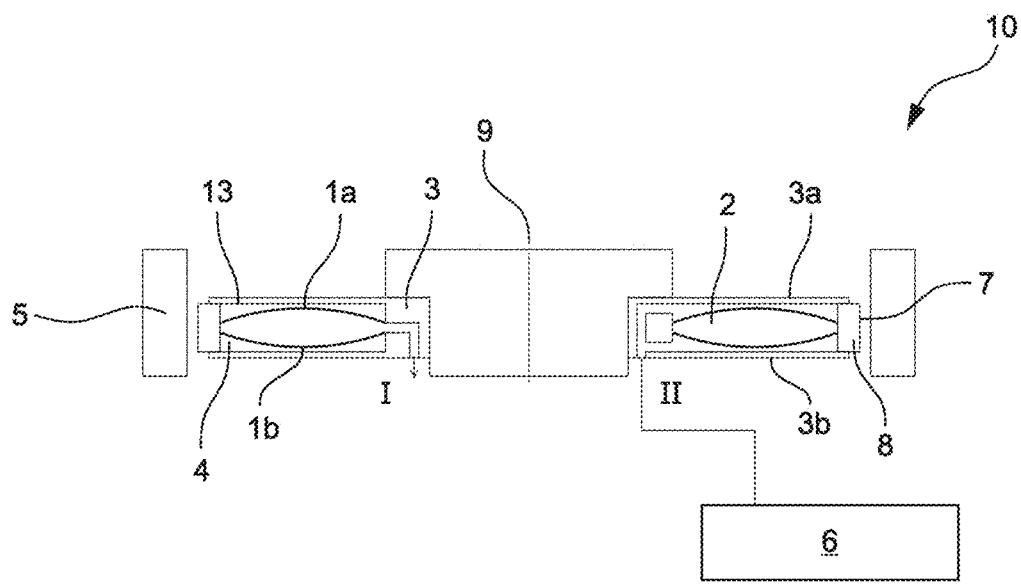
FIG. 3B shows a schematic cross section through an outwardly directed active pneumatic clamping and/or braking device according to the invention in the open state.

FIGS. 2A and 2B show the clamping devices 10 from FIGS. 1A and 1B each in the open state in which the clamping surface 7 does not contact the circumference of the object 5 or is spaced apart from the circumference of the object. The inner pressure space 2 can be connected by means of an opening in the housing 3 to an air connection I (also referred to as "open"), to which a compressed air pump 6 can be connected.

By applying compressed air (for example 4 bar or 6 bar) to the inner pressure space 2 by the compressed air pump 6 and venting the outer pressure space 4, the spring 1 is bent or relaxed to a greater (convex) extent compared with the closed state from FIGS. 1A, 1B, and a radial shortening of the spring 1 or of the distance between the two contact surfaces occurs. The clamping surface 7 lifts off from the object 5 in order to cancel the clamping. The object 5 is freely movable (for example rotatable about axis 9 or linearly movable along axis 9) and the clamping device 10 is open.

It is possible to change back and forth between the closed state and the open state of the device 10.

Such pneumatic clamps 10 have a number of advantages compared with hydraulic clamps.

By using the combination of elastic component, in this case a spring 1 together with spring plates 1a, 1b, and compressed air, very short reaction times are achieved, for example, when switching between the open and closed state and a secure clamping of the object 5 is likewise brought about. The spring 1 can preferably be configured to be plate-shaped, as shown in more detail in FIG. 5, wherein two spring plates 1a, 1b lying one on top of the other form the spring 1 and the inner pressure space 2 of the spring 1 between the plates 1a, 1b. The plates 1a, 1b can likewise be annular, as shown in FIG. 5, and can optionally additionally have radial slots, such that a change in the inner diameter is possible with particularly low forces. The spring plates 1a, 1b can be coated with rubber, at least in the region of slots, in order to produce the tightness required for the compressed air. The spring plates 1a, 1b can also be completely sheathed with rubber. The spring plates 1a, 1b are generally designed to be so pressure-resistant and so elastically bendable and are arranged in the housing 3 of the clamping device 10 in such a way that the inner pressure space 2 is formed inside the spring 1 between the spring plates 1a, 1b and the outer pressure space 4 is formed between each spring plate 1a, 1b and the housing 3 or the housing parts 3a, 3b of the clamping device 10. FIG. 5 shows a three-dimensional view of a clamping device 10 similar to FIGS. 1A and 2A.

By aerating or applying compressed air to the outer pressure space 4 and venting the inner pressure space 2, as shown in FIG. 1A, the spring 1 is at least partially relaxed and brings about a clamping force on the object 5 to be clamped, in particular on the circumference of a shaft 5. As a result, in the event of an energy or pressure failure, the object 5 is clamped or the shaft 5 is immediately brought to a standstill and therefore offers a safety clamping. Depending on the size, such pneumatic clamps 10 can achieve holding moments of several 100 Nm and up to several 1000 Nm, which can be increased even further by additionally applying compressed air to the outer pressure space 4, as indicated in FIG. 1A by a pressure pump 6 (booster). Here, a compressed air of a few bar (for example 4 bar or 6 bar) is sufficient to provide a multiple of the holding moments which are achieved without a booster. In this case, use is made of the fact that small transverse bendings of the plates 1a, 1b (perpendicular to the longitudinal axis thereof) generate large spring forces when switching between the open and closed state of the clamp 10, which can be used for clamping or for releasing prestressed clamping devices 10. Reliable clamping and releasing even of rapidly rotating machine shafts 5 is thus made possible.

In the case of pneumatic material, the costs and the assembly outlay are also lower in comparison with the hydraulic material, and no additional outlay for producing cleanliness on the system arises as a result of the use of compressed air. Such pneumatic clamps also make possible a small overall size, since a small transverse bending and a small (change in the) longitudinal extent of the spring, and thereby small volumes of the pressure spaces, are sufficient to apply the required clamping forces.

In the case of pneumatic clamps, a distinction is made in principle between passive clamping devices 10, as shown in FIGS. 1A to 2B, and active clamping devices 10, as shown in FIGS. 3A to 4B.

In the pressureless initial state, the spring 1 can be bent to different extents (transversely) and can therefore be shortened radially to different extents. The inner side of the housing 3 can be adapted to the bending of the spring plates 1a, 1b or define the latter. A corresponding stop surface for the spring plates 1a, 1b can be formed, for example, by a housing inner wall. The housing inner wall can be designed to be complementary (for example concave) to a (for example convex) bending of the spring plates 1a, 1b.

In the case of passive clamping devices 10, in the pressureless initial state, the spring 1 is generally bent slightly elastically (for example convexly) or is prestressed and the clamping devices 10 can be closed (FIGS. 1A, 1B). The clamping device 10 is opened only by the action of force from the inside via application of compressed air to the inner pressure space 2 (FIGS. 2A, 2B). In most cases, the spring 1 is bent somewhat in the pressureless initial state, with the result that, in the case of clamping or in the case of a pressure drop, the spring force given by the energy stored in the spring 1 is transmitted to the object 5 to be clamped as a clamping force in order to clamp the object 5.

In the case of active clamping devices 10, in the pressureless initial state (FIGS. 3A, 3B), the spring 1 is curved transversely outward to a greater extent, in particular to a greater convex extent, than in the case of passive clamping devices, with the result that the distance between the two radial contact surfaces is shortened and the clamping device 10 is open. No clamping force is brought about on the object 5 via the clamping surface 7. The object is free since the clamping surface 7 does not contact the object 5 or is spaced apart from the object 5.

As a result of plastic deformation of the spring plates 1a, 1b, in the case of the same housing 3 in the pressureless initial state, the spring 1 can be curved transversely outward to a greater extent and can therefore be shortened radially to a greater extent than in the case of passive clamping devices. This smaller radial extent of the spring plates 1a, 1b in the pressureless initial state can lead to an open state of the clamping device 10 in the pressureless initial state. Even in the case of plastic deformation, the spring plates 1a, 1b are elastically bent and press against the contact surfaces, with the result that the spring is fixed in the housing. The inner space of the housing or the recesses can accommodate the curvature brought about to a greater extent by plastic deformation in the initial state.

The clamping force must now be actively induced from the outside, as shown in FIGS. 4A and 4B, in order to transfer the clamp into the closed state. Here, compressed air is introduced into the outer pressure space 4 by means of a compressed air pump 6 and the spring 1 is therefore subjected to compressed air from the outside such that the spring 1 is actively relaxed, the curvature of the spring 1 is reduced, the spacing between the two contact surfaces is increased, and the housing 3 is elastically deformed in the region of the clamping element 8 or the clamping surface 7, with the result that the clamping surface 7 contacts the object 5 and brings about a clamping force on the object 5 and the object 5 is thereby fixedly clamped. The active clamping device 10 is then in the closed state.

Depending on the field of application and prescribed safety regulations, use is therefore made of an active or passive clamping system 10. If primarily a safety clamping is desired, a passive clamping device is generally used. With such pneumatic passive clamping systems, it is possible, even in the pressureless state, during corresponding assembly of the device in an overall device, to generate a predetermined clamping force with which the object 5 to be clamped is subjected. By applying positive pressure or negative pressure, the forces transmitted to this object can be increased, reduced or completely eliminated, which opens up diverse applications. If, on the other hand, primarily a deliberate work operation, such as a tool change, is to be carried out with the clamping device, an active clamping device is generally used.

As represented in FIG. 5A, the housing 3 of the inventive clamping devices 10 comprises two housing parts 3a, 3b which are preferably fastened to each other by fastening means, such as screws, and are mounted such that, in the mounted state, the two housing parts 3a, 3b define an inner space 13 between the housing parts 3a, 3b within the housing 3 in which the spring 1 together with its annular spring plates 1a, 1b and the insert plates (not represented in FIG. 5A) are arranged between the spring plates 1a, 1b. The housing parts 3a, 3b each define a recess 11 which is likewise annular and which serves to receive the annular spring plates 1a, 1b, as represented in FIGS. 5A, 5B. At least a part of the first contact surface 101 can run (substantially) perpendicular to the radial direction R of the annular recess 11 and/or a part of the second contact surface 102 can run (substantially perpendicular) to the radial direction R of the annular recess 11.

An opening 14 (FIG. 5B), into which the object 5 to be clamped, such as a shaft, can be introduced, extends through the center of the housing 3. The housing can extend up to 360° around this opening and at least partially surrounds the object 5 in at least one plane which is referred to as the clamping plane. The central main axis 9 of the clamping devices runs centrally through the opening 14 and perpendicular to the clamping plane. In clamping devices according to FIGS. 1A, 2A, 3A, 4A, 5A, the main axis 9 runs centrally through the shaft along the longitudinal axis thereof.

One or more of the clamping surfaces 7, which brings about the clamping force on the outer circumference of the object 5 in the case of an elastic deformation of the housing 3 in the region of the clamping element 8 or the clamping surface 7 and can thereby clamp the object 5, is/are located along the circumference of the housing 3 or the opening 14. For effective opening and closing of the clamping device 10 with respect to the object 5 to be clamped, without the risk of damage to the object 5, a symmetrical distribution of the clamping force along the clamping surface 7 or along the circumference of the object 5 is desirable. A non-symmetrical distribution of the clamping force can lead to damage to the object 5. One or both contact surfaces 101, 102 are preferably configured to be circular within the clamping plane. The clamping surface 7 is preferably configured to be circular within the clamping plane. The clamping element 8 can be configured to be annular. All annular or circular components described herein can each have, individually or in combination, the point of intersection of the main axis 9 with the clamping plane as the center (e.g. center of the opening 14).

FIG. 5B shows one of the two housing parts 3a (here the upper housing part 3a from FIG. 5A), and one of the two spring plates 1a, 1b of the spring 1. The represented spring plate 1a of the spring 1 extends from a first contact surface 101 within the housing part 3a to a second contact surface 102 within the housing part 3a and can contact the latter. The first contact surface 101 is arranged radially further outside than the second contact surface 102 as viewed from the center of the opening 14.

FIG. 5C shows the section of the housing part 3a represented in FIG. 5B in which the upper plate 1a of the spring 1 meets the first contact surface 101 and is preferably in contact with the latter. FIG. 5D shows the section of the housing part 3a represented in FIG. 5B in which the upper plate 1a of the spring 1 meets the second contact surface 102 and is preferably in contact with the latter. However, it is also possible for one or more further components to be located in each case radially between the spring plate 1a and one or more of the contact surfaces 101, 102, via which further components the spring plate 1*a* exerts its spring force on the contact surfaces 101, 102.

In FIGS. 5B to 5D, the inventive insert plate 100 (cf. FIG. 7) is likewise not shown for simplified representation in the represented housing part 3*a*. As can be seen in FIGS. 5B, 5D, the inner sides of the housing part 3*a* between which the spring plate 1*a* is clamped in the recess and between which the insertion plate extends can be configured to be rectilinear or planar. Each of the plates of the spring 1 is introduced in the direction of the main axis 9 of the clamping devices 10 through the opening 12 into the recess 11 of the respectively associated housing part during assembly along rectilinear or planar inner surfaces of the housing part 3*a*, until the respective plate abuts against a stop 112, 122 at the end of each of the two contact surfaces 101, 102 and therefore cannot be introduced further into the recess 11. Since the extent of the spring plate 1*a* in the clamping plane or in the radial direction of the annular recess is greater than the extent of the inner space defined by the housing part, the plate 1*a* is bent or prestressed in the pressureless initial state. The insertion plate is then placed on the spring plate.

It has been shown, however, that the plates 1*a*, 1*b* of the spring 1 are positioned during assembly as a function of the axial press-in force and are thus not always axially positioned in the same manner in the housing parts 3*a*, 3*b*. The spring plates 1*a*, 1*b* can tilt, be introduced to different depths into the housing parts or bend to different extents. By varying the positioning of the plates 1*a*, 1*b* inside the housing parts, the decisive importance thereof for the opening and closing function of the clamping devices 10 results in a variation of these functions, in particular an asymmetry in the distribution of the clamping force along the clamping surface or the circumference of the opening inside the clamping plane, which is disadvantageous for an effective and durable clamping effect and an intact object.

Figure 6A:
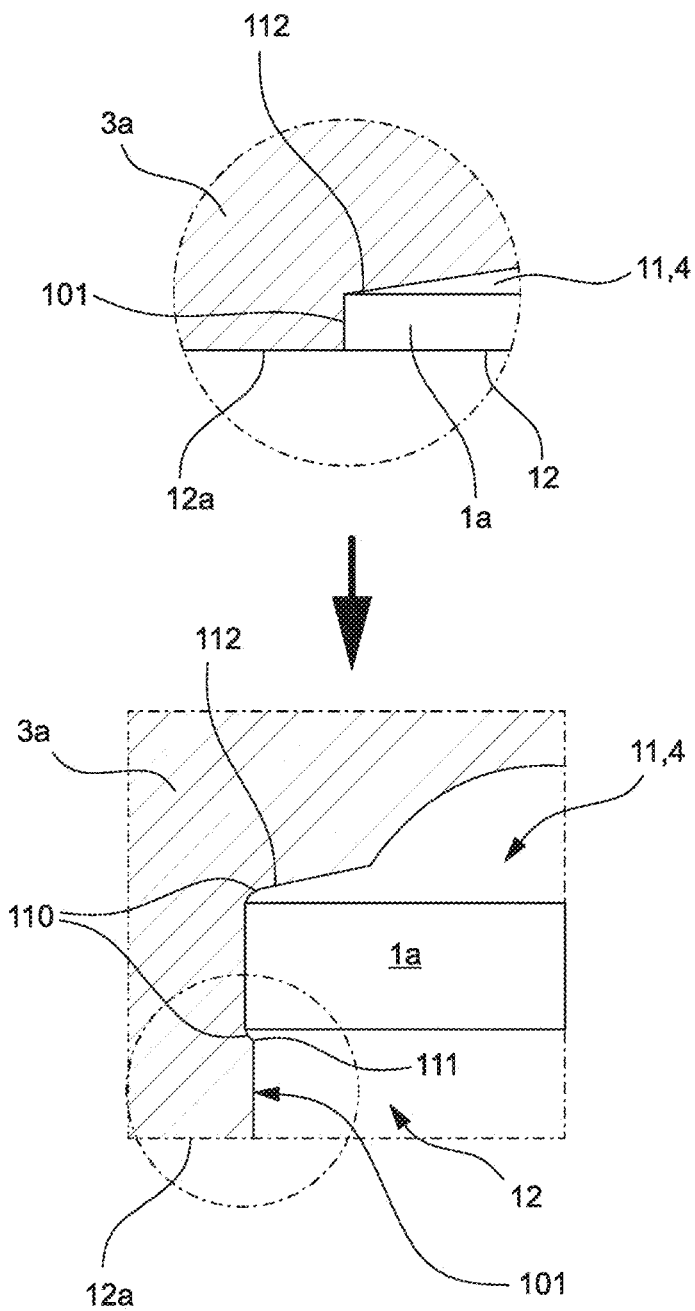
FIGS. 6A to 6B each show the variants of the housing part as represented in FIGS. 5B to 5D in the upper region of the respective figure.
Figure 6B:
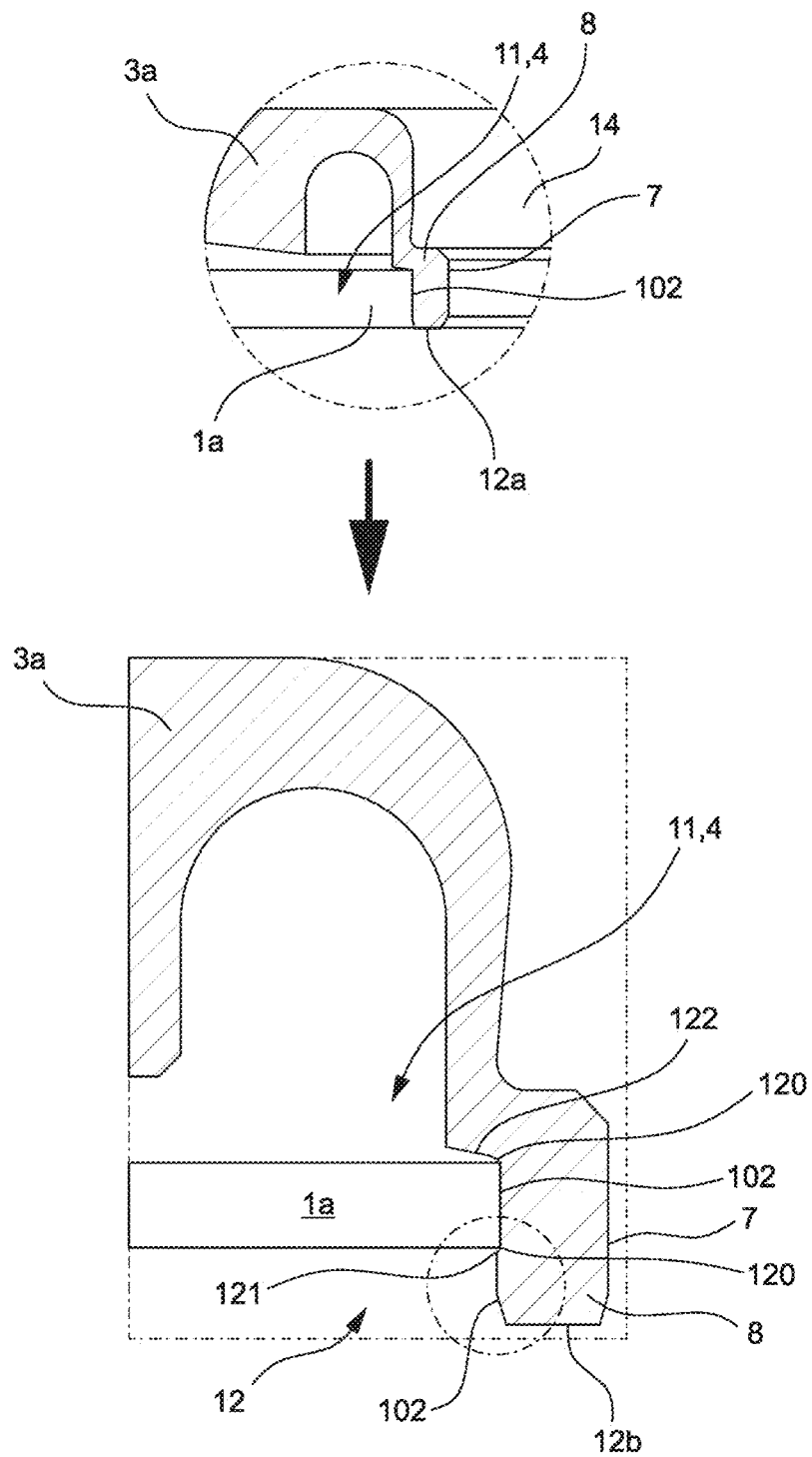

In the lower drawings of FIGS. 6A and 6B, preferred embodiments of the inventive clamping device 10 are represented in comparison with the housing parts according to FIGS. 5C, 5D, the latter being represented once again in the upper drawings of FIGS. 6A and 6B for comparison.

The housing part 3*a*, 3*b* preferably comprises an annular recess 11, which defines a first contact surface 101 of the housing part 3*a*, 3*b* and a second contact surface 102 of the housing part 3*a*, 3*b*. The recess 11 serves to clamp one of the annular spring plates 1*a*, 1*b* between the first contact surface 101 of the housing part 3*a*, 3*b* and the second contact surface 102 of the housing part 3*a*, 3*b*. The housing part 3*a*, 3*b* furthermore comprises a clamping element 8 with a clamping surface 7 which is designed to transmit a clamping and/or braking force to an object 5 to be clamped and/or braked when the spring plate 1*a*, 1*b* is clamped in the recess 11 between the first contact surface 101 and the second contact surface 102 in such a way that a first end of the spring plate 1*a*, 1*b* is supported on the first contact surface 101, the spring plate 1*a*, 1*b* extends from the first contact surface 101 to the second contact surface 102, and a second end of the spring plate 1*a*, 1*b* presses on the second contact surface 102. According to the particularly preferred embodiments, the housing part 3*a*, 3*b* of FIGS. 6A, 6B comprises, in contrast to FIGS. 5B-5D, a first latching means 110 and a second latching means 120, wherein, when the spring plate 1*a*, 1*b* is clamped in the recess 11 between the first contact surface 101 and the second contact surface 102, the first latching means 110 is designed to latch the first end of the spring plate 1*a*, 1*b* to the first contact surface 101 and the second latching means 120 is designed to latch the second end of the spring plate 1*a*, 1*b* to the second contact surface 102.

As represented in the lower drawing of FIG. 6A, a projection 111 is preferably provided on the first contact surface 101 as part of the first latching means. When the plate 1*a* is introduced into the housing part 3*a* along a direction parallel to the main axis 9, the first end of the spring plate 1*a* therefore has to overcome this projection 111, but this leads to the plate 1*a* being arranged in a defined manner between the stop 112 and the projection 111 in the direction of the main axis 9 after this projection 111 has been overcome. The plate 1*a* latches between stop 112 and projection 111 in the region of the first contact surface 101 and can preferably contact the latter there. The projection 111 can be step-shaped or ramp-shaped or have some other shape which provides this function of the projection. The same applies analogously to the inventive second contact surface 102 represented in the lower image of FIG. 6B, on which a projection 121 is likewise preferably formed, which the second end of the spring plate 1*a* has to overcome during introduction along a direction parallel to the main axis 9 before the plate 1*a* is positioned in a defined manner between the stop 122 and the projection 121 and latches there in the region of the second contact surface 102. The second end of the spring plate 1*a* can preferably contact the second contact surface 102 during the latching. The projection 121 can be step-shaped or ramp-shaped or have some other shape which provides this function of the projection 121.

As can be seen from FIGS. 1A to 6B, the first projection 111 and the first stop are further away from the object 5 to be clamped than the second projection 121 and the second stop 122, specifically independently of whether the clamping force acts inward (FIGS. 1A, 2A) or outward (FIGS. 1B, 2B). First projection 111 and first stop 112 can be arranged opposite the clamping element 8 in the housing part 3*a*, 3*b*, while second projection 121 and second stop 122 are arranged in the region of the clamping element 8 or can be part of the clamping element 8. The first stop 112 can have a longer extent in the radial direction R of the annular recess 11 than the first projection 111 (FIGS. 6A, 5B). The first projection 111 can project or project by 0.025 mm to 0.15 mm, preferably 0.05 mm to 0.1 mm, particularly preferably by 0.1 mm, in a radial direction R of the annular recess 11 from or with respect to the first contact surface 101 (e.g. into the recess 11).

The second stop 122 can have a longer extent in the radial direction R of the annular recess 11 than the second projection 121 (FIGS. 6B, 5B). The second projection 121 can project or project by 0.025 mm to 0.15 mm, preferably 0.05 mm to 0.1 mm, particularly preferably by 0.05 mm, in a radial direction R of the annular recess 11 from or with respect to the second contact surface 102 (e.g. into the recess 11).

The annular recess 11 can define an annular opening 12 in the housing part 3*a*, 3*b* (in the clamping plane), wherein the annular opening 12 is formed between a first annular edge 12*a* of the housing part and a second annular edge 12*b* of the housing part, and wherein the annular opening 12 serves to introduce the spring plate 1*a* into the recess 11. The first projection 111 can be arranged between the first annular edge 12*a* and the first contact surface 101 on an inner side of the housing part 3*a* in the region of the recess 11 and project into the recess 11. The second projection 121 can be arranged between the second annular edge 12*b* and the second contact surface 102 on an inner side of the housing part in the region of the recess 11 and project into the recess 11 (FIGS. 6A, 6B).

Projection 111 and stop 112 can define a groove in the housing part 3a, into which the first end of the spring plate 1a can latch, wherein the first contact surface 101 can form part of the groove. Projection 121 and stop 122 can define a groove in the housing part 3a, into which the second end of the spring plate 1a can latch, wherein the second contact surface 102 can form part of the groove.

By creating the latching means 110, 120, preferably by means of projections 111, 121, possibly in combination with the optional stops 112, 122, in the regions of the two contact surfaces 101, 102, a (in particular axial) forced position is created for the spring plate 1a, 1b. As a result of this forced positioning, the spring plate 1a, 1b is mounted in a stable manner, in particular positioned in an axially defined manner in the direction parallel to the main axis 9 of the clamping device 10, and the position of the spring plate 1a, 1b is therefore no longer decisively positioned inside the housing parts 3a, 3b as a function of the axial press-in force. As a result of the (axially) clearly defined position of each of the spring plates 1a, 1b of the spring 1, the curvature of the spring plates 1a, 1b is also configured to be well-defined and as desired in the pressureless state.

As a result of the latching means 110, 120, the two spring plates 1a, 1b can be arranged in the clamping device 10 more precisely with a well-defined uniform spacing from one another inside the housing 3. The spring plates 1a, 1b can be positioned by the latching means 110, 120 with their longitudinal axes parallel to the clamping plane. The symmetrical functional structure achieved by the latching means 110, 120 generates symmetrical stresses of the spring 1 over the entire circumference of the opening 14 and thus leads to a very effective clamping force distribution uniformly around the object 5 in the clamping plane.

The opening and closing functions can thus take place symmetrically and more reliably by the latching means 110, 120 over the circumference of the opening 14. Possible undesired radial or axial movements of the housing 3 thus do not lead to undesired axial or radial geometric displacements on the clamping surface 7.

In addition to the creation of the described axial forced position for the spring plates, the latching means also have the advantageous effect that, as a result of the well-defined axial positioning of the spring plate, the axial positioning of the insertion plate is also defined even more precisely axially, since the insertion plate rests on the spring plate or the axial positioning of the insertion plate is also determined by the axial positioning of the spring plate. As a result, the displacement of the volume in the inner space by the insertion plate is configured even more precisely axially defined, uniformly along the spring plates, and axially symmetrically, which has an advantageous effect on the desired unchanged, uniform and axially symmetrical dynamics of each spring plate.

The inventors have discovered that, in addition to the insertion plate 100, an improved sealing effect between the spring plates 1a, 1b and between each of the two housing parts 3a, 3b with the associated plate 1a, 1b of the spring 1 is also achieved by these latching means 110, 120, in particular by the projections 111, 121, in addition to the axially well-defined and symmetrical positioning inside the housing. These improved sealing effects by insertion plate and latching means are of particular advantage in particular in the additional application of compressed air in the inner and outer pressure spaces 2, 4 for transferring the clamping devices into another of the two described states. The insertion plate 100 and the latching means 110, 120, in particular the projections 111, 121, bring about a contact, which is greatly improved with regard to the sealing effect, between the rubber coatings of the plates 1a, 1b and the rubber coating of each plate 1a, 1b with the respective housing part 3a, 3b.

The inventors have identified further additional advantages by creating the latching means 110, 120, in particular the projections 111, 121. For example, the defined position of the rubberized spring plates 1a, 1b via the adaptation of the rubber thicknesses around the spring plates allows targeted stroke limitations of the plates to be installed as protection against incorrect applications (e.g. zero crossing) with excessively high operating pressure (in particular in the case of boosters) and likewise the requirement (volume) for pressure medium is reduced as a result and the opening and closing speeds of the clamping device 10 are increased as a result. These advantages can also be achieved by the insertion plate 100.

However, the advantages of the latching means do not necessarily have to be implemented in order to implement the advantages of the insertion plate. Independently of whether or not the particularly preferred latching means are used in the housing parts, the inventive clamping and/or braking device has an insert plate 100.

Figure 7:
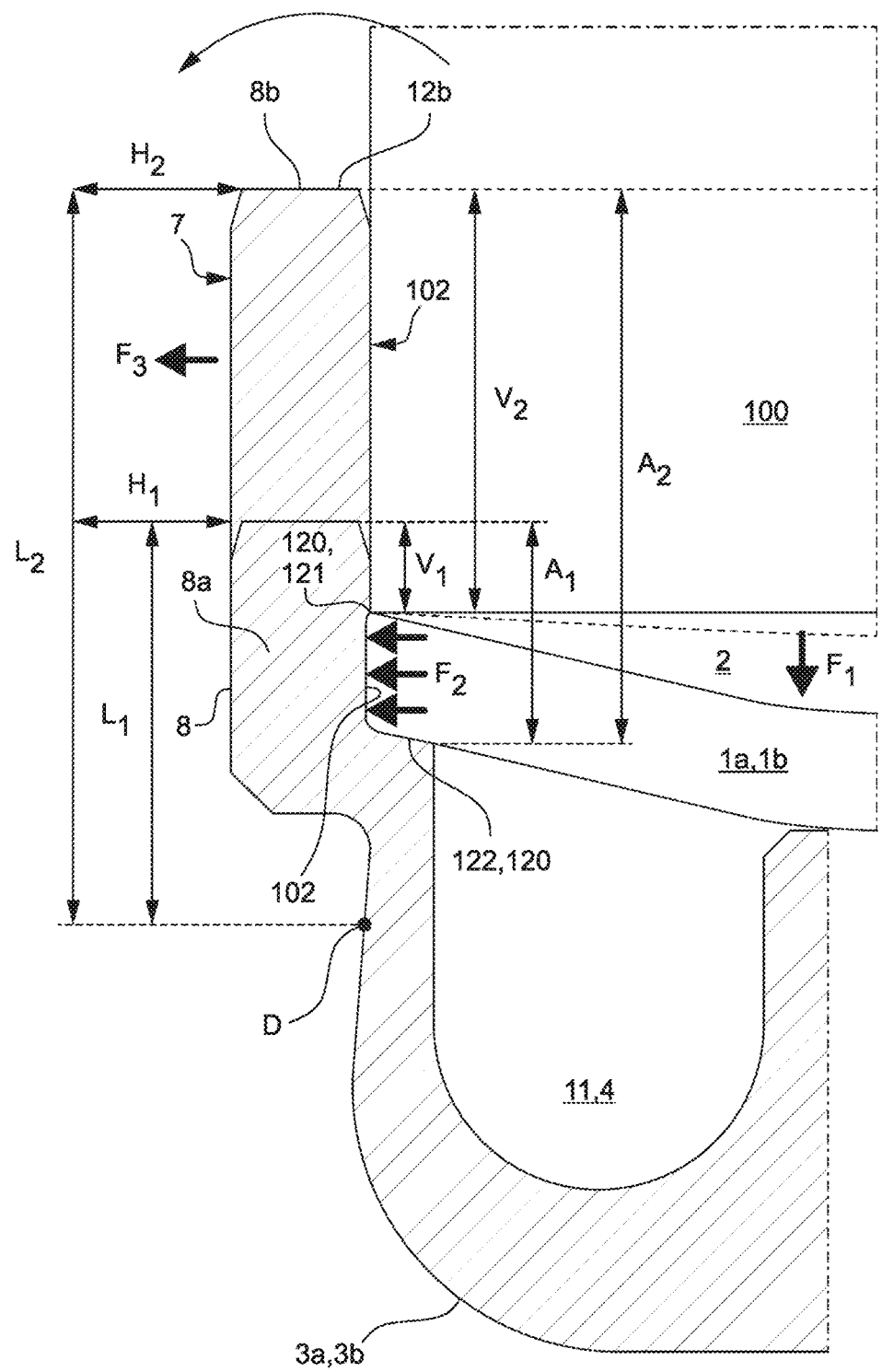
FIG. 7 shows a particularly preferred embodiment of the inventive clamping and/or braking device with a housing part according to FIG. 6B.

FIG. 7 shows a preferred embodiment of the inventive clamping and/or braking device with a housing part according to FIG. 6B, i.e. with optional latching means 120 comprising the optional projection 121.

The figure shows a housing part 3a or 3b with the associated spring plate 1a or 1b and an insertion plate 100 represented here which is arranged between this spring plate and the spring plate of a further housing part opposite the housing part shown in FIG. 7.

If a force $F_1$ for bending the spring plate 1a or 1b is brought about by ventilation or application of pressure medium in the second (inner) pressure space 2, this bending of the spring plate leads to a spring force $F_2$ with which one end of the spring plate presses against the second contact surface 102. In the preferred embodiment shown here by way of example, the spring plate presses against the second contact surface 102 in the region between the second stop 122, which can also be part of the latching means 120, and the first projection 121, which can also be part of the latching means 120. However, stop, projection and latching means are optional.

The spring force $F_2$ acting on the second contact surface 102 ensures an elastic deformation of the clamping element 8. The clamping element 8 can be elastic such that the clamping element forms a lever arm 8a which is designed to deform elastically by pressing the spring plate 1a or 1b on the second contact surface 102 of the housing part 3a or 3b with spring force $F_2$ and thereby to rotate about a pivot point D (cf. bent arrow in FIG. 7) such that the clamping surface 7 of the clamping element 8 transmits the clamping and/or braking force $F_3$ to the object 5 to be clamped and/or braked. The pivot point D can be in the region of the housing part 3a, 3b at an end of the lever arm 8a opposite the end 8b, for example in the triangle denoted by D in FIG. 7. The action of the spring force $F_2$ on the second contact surface 102, which is facing away from and opposite the clamping surface 7 here, brings about the rotation of the lever arm 8a about the pivot point D such that the end 8b of the lever arm 8a moves towards the object 5 to be clamped. The end 8b in this case moves by a radial stroke $H_2$ towards the object to be clamped and the clamping surface 7 contacts the object to be clamped. A spring force $F_2$ is thus brought about by the bending force $F_1$, which spring force in turn brings about a clamping force $F_3$ which acts via the clamping surface 7 in the region of the end 8*b* of the lever arm 8*a* of the clamping element 8 on the object 5 to be clamped and clamps the latter. The device is thus transferred into the closed state.

The insertion plate 100 in this case allows the length, $L_2$, of the lever arm 8*a* to be configured to be longer than in conventional clamping devices which have a length $L_1$. A greater radial stroke $H_2$ is achieved by a greater length $L_2$ than the commercial radial stroke $H_1$ from the prior art. This leads to the above-described advantages of the longer lever arm 8*a* and of the greater radial stroke $H_2$ being able to be achieved without the increase in the volume inside the clamping device 10 in the region of the inner space 13 leading to a reduction in the closing and opening speed of the clamping device 10. The dynamics of the spring plates 1*a*, 1*b* can thus remain unchanged as desired. In this case, (approximately) $L_2/L_1=H_2/H_1$ applies. The ratio $L_2/L_1$ or $H_2/H_1$ can be at least 1.3, at least 1.4, at least 1.5, or at least 1.7, or preferably in a range from 1.3 to 2.2 or 1.4 to 2.2 or 1.4 to 2.0 or 1.4 to 1.7 or 1.3 to 1.8.

The distance $A_2$ between the second stop 122 and the second annular edge 12*b* in a device 10 with insertion plate 100 can, as described, preferably be 3 mm to 6 mm, 4 mm to 5 mm, or approximately 4.7 mm, which is more than the corresponding distance $A_1$ in conventional devices 10 without insertion plate.

Preferably, the second projection 121, or the step 121 or ramp 121 of the second projection, can, as described, be arranged at a distance $V_2$ of 2 mm to 6 mm, 3 mm to 5 mm, 3 mm to 4 mm, or about 3.2 mm from the second annular edge 12*b* on the second contact surface 102 of the housing part in the region of the recess 11, wherein $V_2$ is greater than the corresponding distance $V_1$ in conventional devices 10 without insertion plate.

By means of the combination of insertion plate 100 and lever arm 8*a* described in FIG. 7 within the scope of a preferred embodiment according to the invention, wear is reduced and at the same time the clamping operation is more effective, without negatively impairing the dynamics of the spring plates.

Preferred embodiments of the subject matter claimed by the following claims are described in the description and in the figures. The optional features disclosed in the above description, the claims and the drawings can be used both individually and in any combination for the implementation of the subject matter claimed here according to the accompanying claims in their various configurations.

The various aspects and embodiments described above can be combined in order to create yet further embodiments. These and other changes can be made to the embodiments in the light of the above detailed description. In general, the terms used in the following claims should not be interpreted as limiting the claims to the specific aspects and embodiments disclosed in the description and the claims, but rather as comprising all possible embodiments together with the full scope of equivalents to which these claims are entitled.

The invention claimed is:

1. A clamping or braking device for clamping or braking an object to be clamped or braked, comprising:
    a housing comprising a first housing part and a second housing part, wherein each of the housing parts comprises an annular recess defining a first contact surface of the housing part and a second contact surface of the housing part, and wherein the two housing parts are arranged relative to each other and fastened to each other such that the recesses of the first and second housing parts together form an inner space within the housing;
    a spring arranged in the inner space comprising a first annular spring plate and a second annular spring plate, wherein the first annular spring plate is clamped in the annular recess of the first housing part between the first contact surface and the second contact surface of the first housing part, and wherein the second annular spring plate is clamped in the annular recess of the second housing part between the first contact surface and the second contact surface of the second housing part;
    at least one clamping element, wherein each clamping element has a clamping surface which is designed to transmit a clamping or braking force to the object to be clamped or braked when a first end of one of the spring plates is supported on the first contact surface of one of the housing parts and a second end of the one of the spring plates presses on the second contact surface of the one of the housing parts;
    wherein the spring plates are arranged within the inner space in such a way that at least one pressure space is formed in the inner space, which pressure space is at least partially delimited by the spring plates, wherein the pressure space is ventilable or ventable and can be acted on by positive pressure of a pressure medium which is suppliable to the housing, wherein the spring plates are arranged relative to the at least one pressure space in such a way that by ventilating or venting the pressure space or acting on the pressure space with positive pressure, a bending of at least one of the spring plates is changeable and thereby the device changes between an open state, in which the object is spaced apart from the clamping surfaces, and a closed state, in which one or more of the clamping surfaces transmit a clamping or braking force to the object;
    wherein the clamping or braking device further comprises at least one insert plate which is arranged between the first spring plate and the second spring plate in the inner space; and
    wherein the clamping element is elastic such that the clamping element forms a lever arm which is designed to deform elastically by pressing at least one of the spring plates on the second contact surface of at least one of the housing parts and thereby to rotate about a pivot point such that the clamping surface of the clamping element transmits the clamping or braking force to the object to be clamped or braked.

2. The clamping or braking device according to claim 1, wherein the insert plate extends in each of the housing parts between the respective first contact surface and the respective second contact surface.

3. The clamping or braking device according to claim 1, wherein the insert plate is annular.

4. The clamping or braking device according to claim 1, wherein the insert plate is rigid.

5. The clamping or braking device according to claim 1, wherein the clamping element has the clamping surface on a first side surface and the second contact surface of one of the housing parts on a second side surface.

6. The clamping or braking device according to claim 1, wherein the lever arm is designed such that during the rotation of the lever arm about the pivot point an end of the lever arm is moved closer to the object by a radial stroke.

7. The clamping or braking device according to claim 6, wherein a length of the lever arm from the pivot point to the end of the lever arm is chosen such that the radial stroke is at least 0.13 mm.

8. The clamping or braking device according to claim 6, wherein a length of the lever arm from the pivot point to the end of the lever arm is 4 mm to 8 mm, 5 mm to 7 mm, 6 mm to 7 mm or about 6.6 mm.

9. The clamping or braking device according to claim 1, wherein the annular recess of each housing part defines an annular opening in the housing part, wherein the annular opening is formed between a first annular edge of the housing part and a second annular edge of the housing part,
wherein the first contact surface of each housing part is delimited by the first annular edge of the housing part and a first stop of the housing part such that upon insertion of one of the spring plates from the outside past the first annular edge into the recess of the housing part, the first stop forms an obstacle against a deeper insertion of the spring plate into the recess, or
wherein the second contact surface of each housing part is delimited by the second annular edge of the housing part and a second stop of the housing part such that upon insertion of one of the spring plates from the outside past the second annular edge into the recess of the housing part, the second stop forms a second obstacle against a deeper insertion of the spring plate into the recess.

10. The clamping or braking device according to claim 9, wherein each of the housing parts comprises a first latching means and a second latching means, wherein the respective spring plate is clamped in the recess of the housing part between the first contact surface and the second contact surface of the housing part such that the first latching means latches the first end of the respective spring plate to the first contact surface and the second latching means latches the second end of the respective spring plate to the second contact surface.

11. The clamping or braking device according to claim 10, wherein the first latching means comprises a first projection of the first contact surface and the first stop, which together latch the first end of the respective spring plate between the first projection and the first stop in the region of the first contact surface, or that the second latching means comprises a second projection of the second contact surface and the second stop, which together latch the second end of the respective spring plate between the second projection and the second stop in the region of the second contact surface.

12. The clamping or braking device according to claim 11, wherein the first projection comprises a step or ramp or that the second projection comprises a step or ramp.

13. The clamping or braking device according to claim 12, wherein the first projection is arranged between the first annular edge and the first stop on the first contact surface of the respective housing part in the region of the recess, or,
wherein the second projection is arranged between the second annular edge and the second stop on the second contact surface of the respective housing part in the region of the recess.

14. The clamping or braking device according to claim 1, wherein the at least one pressure space comprises a first pressure space which is arranged outside the spring between at least one of the spring plates and the housing.

15. The clamping or braking device according to claim 14, wherein the first spring plate is designed to reduce bending of the first spring plate by ventilating the first pressure space or by applying positive pressure to the first pressure space in order to press, when the first end of the first spring plate is supported on the first contact surface of the first housing part, with the second end of the first spring plate on the second contact surface of the first housing part such that a transmission of a clamping or braking force from the clamping surface of the clamping element to the object to be clamped or braked is effected thereby and the device changes from the closed state to the open state of the first housing part, or,
wherein the second spring plate is designed to reduce bending of the second spring plate by ventilating the first pressure space or by applying positive pressure to the first pressure space in order to press, when the first end of the second spring plate is supported on the first contact surface of the second housing part, with the second end of the second spring plate on the second contact surface of the second housing part such that a transmission of a clamping or braking force from the clamping surface of the clamping element to the object to be clamped or braked is effected thereby and the device changes from the closed state to the open state of the first housing part.

16. The clamping or braking device according to claim 14, wherein the device is designed such that by ventilating the first pressure space or by applying positive pressure to the first pressure space, the first contact surface and the second contact surface of at least one of the two housing parts move away from one another or the bending of at least one of the spring plates is reduced and the device changes thereby from the closed state to the open state.

17. The clamping or braking device according to claim 1, wherein the at least one pressure space comprises one or more second pressure spaces, wherein the one or more second pressure spaces are arranged inside the spring between each of the two spring plates and the insert plate.

18. The clamping or braking device according to claim 17, wherein the device is designed such that by ventilating the one or more second pressure spaces or by applying positive pressure to the one or more second pressure spaces, the first contact surface and the second contact surface of at least one of the two housing parts move towards one another or the bending of at least one of the spring plates is increased and the device changes thereby from the closed state to the open state.

19. The clamping or braking device according to claim 17, wherein between the insert plate and each of the two spring plates a separate second pressure space is formed to which a pressure medium can be applied separately from the outside, or that regions of the inner space between the insert plate and each of the two spring plates together form a second pressure space to which a pressure medium can be applied from the outside.

20. The clamping or braking device according to claim 7, wherein the length of the lever arm from the pivot point to the end of the lever arm is chosen such that the radial stroke is at least 0.15 mm.

* * * * *